United States Patent
Moczygemba

(10) Patent No.: US 7,295,496 B2
(45) Date of Patent: Nov. 13, 2007

(54) METHOD OF IMPROVING READABILITY IN OPTICAL DRIVES

(75) Inventor: Nathan D. Moczygemba, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 489 days.

(21) Appl. No.: 10/891,627

(22) Filed: Jul. 15, 2004

(65) Prior Publication Data

US 2006/0013084 A1    Jan. 19, 2006

(51) Int. Cl.
*G11B 7/00* (2006.01)

(52) U.S. Cl. .................................. 369/44.27

(58) Field of Classification Search .............. 369/44.27, 369/44.28, 44.26, 47.1, 47.27, 47.28, 44.41
See application file for complete search history.

(56) References Cited

U.S. PATENT DOCUMENTS

| | | | |
|---|---|---|---|
| 5,317,391 A | 5/1994 | Banker et al. | 348/6 |
| 5,561,655 A | 10/1996 | Gage et al. | 369/110 |
| 5,627,818 A | 5/1997 | Gardner et al. | 369/275.4 |
| 5,708,636 A * | 1/1998 | Takahashi et al. | 369/44.41 |
| 5,777,962 A | 7/1998 | Gardner et al. | 369/44.27 |
| 5,878,015 A | 3/1999 | Schell et al. | 369/116 |
| 5,912,874 A | 6/1999 | Gardner et al. | 369/275.1 |
| 5,963,515 A | 10/1999 | Shindo et al. | 369/44.23 |
| 6,034,364 A | 3/2000 | Schell | 250/201.5 |
| 6,064,637 A | 5/2000 | Ju et al. | 369/44.23 |
| 6,069,857 A | 5/2000 | Schell et al. | 369/54 |
| 6,087,644 A | 7/2000 | Schell | 250/201.5 |
| 6,122,232 A | 9/2000 | Schell et al. | 369/44.11 |
| 6,236,625 B1 | 5/2001 | Schell et al. | 369/13 |
| 6,243,336 B1 | 6/2001 | Schell et al. | 369/44.29 |
| 6,266,306 B1 | 7/2001 | Schell et al. | 369/44.34 |
| 6,278,665 B1 | 8/2001 | Schell et al. | 369/13 |
| 6,404,710 B1 | 6/2002 | Ichimura et al. | 369/44.23 |
| 6,418,097 B1 | 7/2002 | Schell et al. | 369/44.34 |
| 6,434,087 B1 | 8/2002 | Schell et al. | 369/13 |
| 6,459,660 B1 | 10/2002 | Gerber et al. | 369/44.23 |
| 6,483,787 B1 * | 11/2002 | Sugasawa et al. | 369/44.13 |
| 6,597,642 B1 * | 7/2003 | Ijima et al. | 369/44.11 |

* cited by examiner

*Primary Examiner*—Nabil Hindi
(74) *Attorney, Agent, or Firm*—Baker Botts L.L.P.

(57) ABSTRACT

A method of improving readability in an optical drive is disclosed. In one aspect, the present disclosure teaches a method of improving readability in an optical drive including monitoring a compact disc (CD) media for tracking errors using a differential push-pull (DPP) method during an input/output (I/O) operation in an optical drive. The method further includes determining whether a tracking error is above a predetermined error threshold or if a read error has occurred. In response to a read error or tracking error, the method further includes switching from the DPP method to a three-beam tracking method based on the determination.

20 Claims, 3 Drawing Sheets

METHOD OF IMPROVING READABILITY IN OPTICAL DRIVES

TECHNICAL FIELD

The present disclosure relates generally to information handling systems and, more particularly, to a method of improving readability in an optical drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer system is one type of information handling system. Examples of computer systems include servers, personal computers, notebook and laptop computers, workstations and personal digital assistants. Typically, the computer system includes a processor, memory, a display, a keyboard, hard disk storage and one or more input/output ("I/O") devices, such as a floppy drive or an optical drive. Examples of optical drives include compact disc (CD), CD-read only media (CD-ROM), CD-recordable (CD-R), CD-rewritable (CD-RW), digital versatile disc (DVD), DVD-ROM, DVD-R, DVD-RW, DVD+R, DVD+RW and combinations there of (e.g., CD-RW/DVD drive).

Generally, these optical drives read and may write information to/from compact disc (CD) or digital versatile disc (DVD) media. During read operations, the CD media is usually placed inside the drive such that a focused light or laser reflects off pits formed in a groove on the CD media as the CD revolves around a spindle in the drive. These reflected light beams are then translated into an electrical signal to form computer-readable information. Because the computer-readable information depends on the reflections from the pits and lands on the CD media, the drive must be able to track the groove on the media in order to read the media.

To track the groove, optical drives typically employ different tracking methods such as a differential push-pull (DPP) method, differential phase detection (DPD) or a three-beam tracking method. Of these methods, it is preferable for Recordable drives to use the DPP method for CD media. CD media can be produced in three ways. Media can be created using a stamper that physically puts pits in to a reflective layer or can be recorded by an optical drive that can change the color of the dye in the dye layer of recordable media. The third method is to change the phase of the amorphous crystalline layer of re-writable media. The DPP method does not perform well with CD media that has pit depths or grooves deeper than allowed by a CD media specification. As such the tracking signal from the DPP tracking method has a lower signal-to-noise ratio and a weak contrast that causes the drive to move off track. When the drive moves off-track, an error typically occurs that causes the read of the CD media to fail.

SUMMARY

Thus, a need has arisen for a method of improving readability in an optical drive.

In accordance with teachings of the present disclosure, in one embodiment, a method of improving readability in an optical drive including monitoring a compact disc (CD) media for tracking errors using a differential push-pull (DPP) method during an input/output (I/O) operation in an optical drive. The method further includes determining whether the tracking error is above a predetermined error threshold or if a read error has occurred. The method further includes switching from the DPP method to a modified three-beam tracking method based on the determination.

In other embodiments, an information handling system including a processor and memory operably coupled to the processor. The information handling system further includes an optical drive communicatively coupled to the processor. The optical drive operable to perform input/output operations. The information handling system further includes an optical tracking system forming a part of the I/O operations. The optical tracking system operable to follow a track on a compact disc (CD) placed in the optical drive. The optical tracking system including a center beam operable to read information on the track. The optical tracking system further including tracking beams operably set between a centerline of adjacent tracks and an edge of the track.

In further embodiments, a system for improving readability in an optical drive including an optical drive operable to perform input/output operations. The optical drive including an optical tracking system. The optical tracking system operable to follow a track on a compact disc (CD) placed in the optical drive. The optical tracking system including a center beam operable to read information on the track. The optical tracking system further includes tracking beams having modified beam angles that are operably set between a centerline of adjacent tracks and an edge of the track, wherein the tracking beams are operably set to switch between a differential push-pull (DPP) tracking method and a three-beam tracking method.

In one aspect, teachings of the present disclosure provide the technical advantage of selectively switching between two different tracking methods. Because the tracking beams are at modified angles, photo detectors are able to track the CD using either method. Therefore, if a default method is unable to read a certain part of the CD media, the optical drive may selectively switch to an alternative tracking method.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
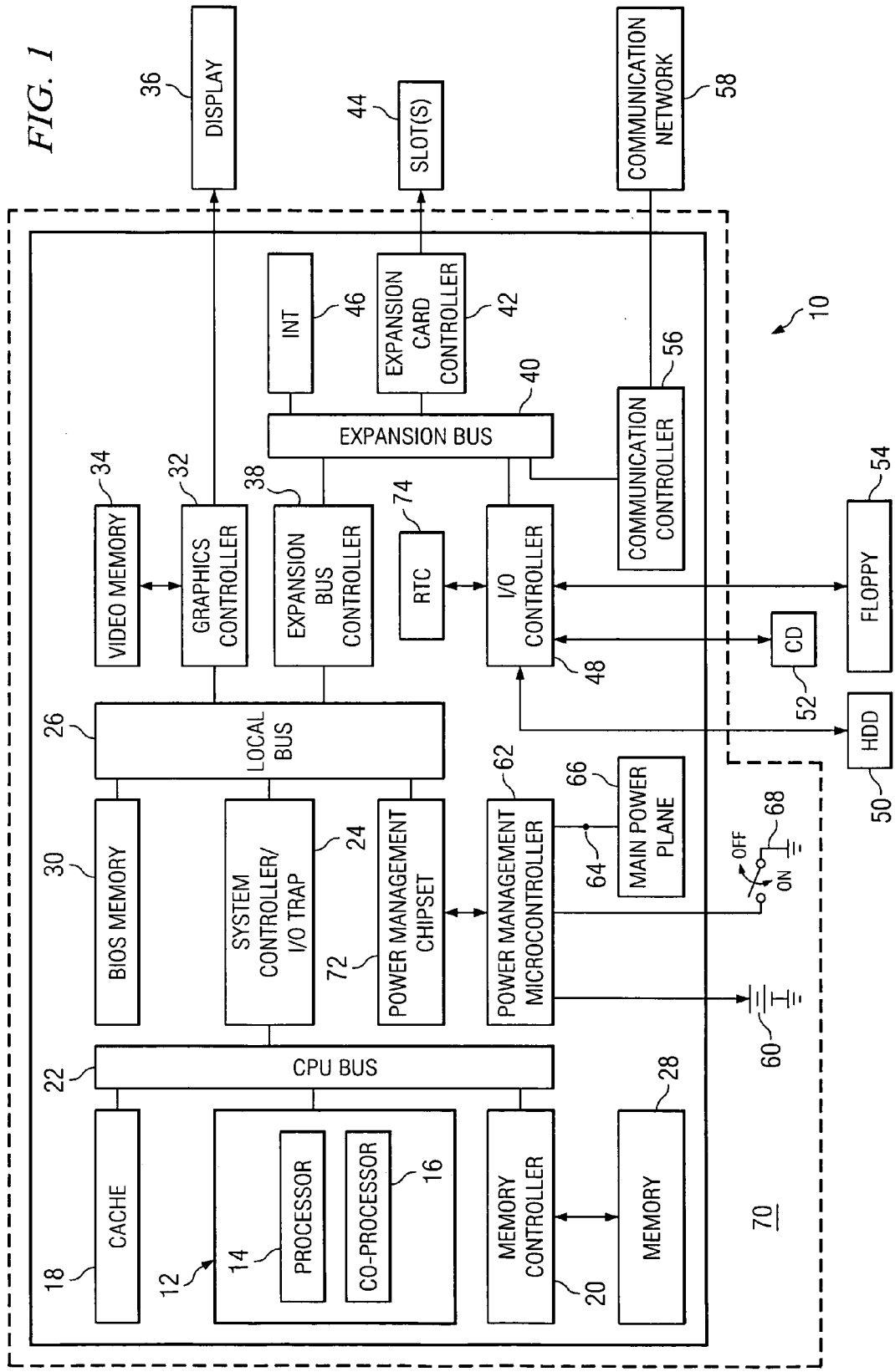
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes at least one microprocessor or central processing unit (CPU) 12. CPU 12 may include processor 14 for handling integer operations and coprocessor 16 for handling floating point operations. CPU 12 is preferably coupled to cache 18 and memory controller 20 via CPU bus 22. System controller I/O trap 24 preferably couples CPU bus 22 to local bus 26 and may be generally characterized as part of a system controller.

Main memory 28 of dynamic random access memory (DRAM) modules is preferably coupled to CPU bus 22 by a memory controller 20. Main memory 28 may be divided into one or more areas such as system management mode (SMM) memory area (not expressly shown).

Basic input/output system (BIOS) memory 30 is also preferably coupled to local bus 26. FLASH memory or other nonvolatile memory may be used as BIOS memory 30. A BIOS program (not expressly shown) is typically stored in BIOS memory 30. The BIOS program preferably includes software which facilitates interaction with and between information handling system 10 devices such as a keyboard (not expressly shown), a mouse (not expressly shown), or one or more I/O devices. BIOS memory 30 may also store system code (note expressly shown) operable to control a plurality of basic information handling system 10 operations.

Graphics controller 32 is preferably coupled to local bus 26 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Bus interface controller or expansion bus controller 38 preferably couples local bus 26 to expansion bus 40. In one embodiment, expansion bus 40 may be configured as an Industry Standard Architecture ("ISA") bus. Other buses, for example, a Peripheral Component Interconnect ("PCI") bus, may also be used.

In certain information handling system embodiments, expansion card controller 42 may also be included and is preferably coupled to expansion bus 40 as shown. Expansion card controller 42 is preferably coupled to a plurality of information handling system expansion slots 44. Expansion slots 44 may be configured to receive one or more computer components 80 (shown below in more detail) such as an expansion card (e.g., modems, fax cards, communications cards, and other input/output (I/O) devices).

Interrupt request generator 46 is also preferably coupled to expansion bus 40. Interrupt request generator 46 is preferably operable to issue an interrupt service request over a predetermined interrupt request line in response to receipt of a request to issue interrupt instruction from CPU 12.

I/O controller 48, often referred to as a super I/O controller, is also preferably coupled to expansion bus 40. I/O controller 48 preferably interfaces to an integrated drive electronics (IDE) hard drive device (HDD) 50, CD-ROM (compact disk-read only memory) drive 52 and/or a floppy disk drive (FDD) 54. Other disk drive devices (not expressly shown) which may be interfaced to the I/O controller include a removable hard drive, a zip drive, a CD-RW (compact disk-read/write) drive, and a CD-DVD (compact disk—digital versatile disk) drive.

Communication controller 56 is preferably provided and enables information handling system 10 to communicate with communication network 58, e.g., an Ethernet network. Communication network 58 may include a local area network (LAN), wide area network (WAN), Internet, Intranet, wireless broadband or the like. Communication controller 56 may be employed to form a network interface for communicating with other information handling systems (not expressly shown) coupled to communication network 58.

As illustrated, information handling system 10 preferably includes power supply 60, which provides power to the many components and/or devices that form information handling system 10. Power supply 60 may be a rechargeable battery, such as a nickel metal hydride ("NiMH") or lithium ion battery, when information handling system 10 is embodied as a portable or notebook computer, an A/C (alternating current) power source, an uninterruptible power supply (UPS) or other power source.

Power supply 60 is preferably coupled to power management microcontroller 62. Power management microcontroller 62 preferably controls the distribution of power from power supply 60. More specifically, power management microcontroller 62 preferably includes power output 64 coupled to main power plane 66 which may supply power to CPU 12 as well as other information handling system components. Power management microcontroller 62 may also be coupled to a power plane (not expressly shown) operable to supply power to an integrated panel display (not expressly shown), as well as to additional power delivery planes preferably included in information handling system 10.

Power management microcontroller 62 preferably monitors a charge level of an attached battery or UPS to determine when and when not to charge the battery or UPS. Power management microcontroller 62 is preferably also coupled to main power switch 68, which the user may actuate to turn information handling system 10 on and off. While power management microcontroller 62 powers down one or more portions or components of information handling system 10, e.g., CPU 12, display 36, or HDD 50, etc., when not in use to conserve power, power management microcontroller 62 itself is preferably substantially always coupled to a source of power, preferably power supply 60.

Computer system, a type of information handling system 10, may also include power management chip set 72. Power management chip set 72 is preferably coupled to CPU 12 via local bus 26 so that power management chip set 72 may receive power management and control commands from CPU 12. Power management chip set 72 is preferably connected to a plurality of individual power planes operable to supply power to respective components of information handling system 10, e.g., HDD 50, FDD 54, etc. In this manner, power management chip set 72 preferably acts under the direction of CPU 12 to control the power supplied to the various power planes and components of a system.

Real-time clock (RTC) 74 may also be coupled to I/O controller 48 and power management chip set 72. Inclusion of RTC 74 permits timed events or alarms to be transmitted to power management chip set 72. Real-time clock 74 may be programmed to generate an alarm signal at a predetermined time as well as to perform other operations.

Information handling system 10 is typically includes chassis 70. Generally, chassis 70 is referred to as the computer case or case that encloses the components of information handling system 10. However, some components such as CD 52, floppy 54 and HDD 50, may be separately connected to information handling system 10 and may be referred to as an external component. Generally, CD 52 refers to a variety of optical drives that may be used for I/O access to information handling system 10. By improving the readability of the optical drives, information handling system 10 may be able to access additional information stored on CD media 94.

Figure 2:
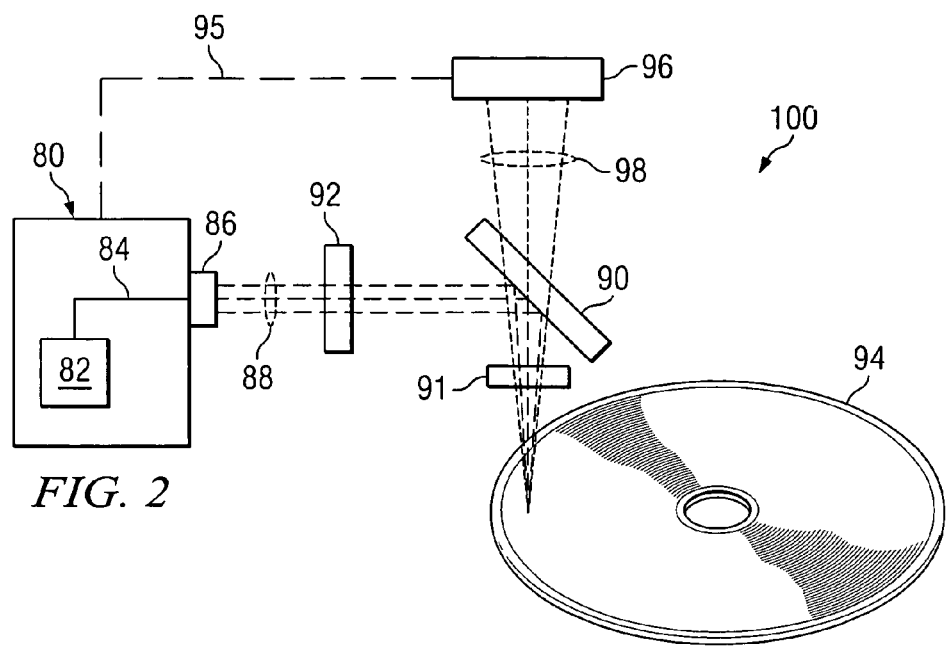
FIG. 2 illustrates an example embodiment of an optical drive that forms a part of an information handling system, according to teachings of the present disclosure.

Referring to FIG. 2, optical drive 100 may form a part of information handling system 10. Optical drive 100 may vary depending on the type of optical media 94 that is used with the drive. For example, a compact disk ("CD") drive may only read data from optical media 24 such as a CD-ROM (CD-read only memory). However, if a user desires to have both read and write capabilities, another type of optical drive 100 may be used such as a CD-RW drive that has the capabilities to read from and write to certain optical media such as a CD-R or a CD-RW. Other types of optical drive 100 may use different types of optical media 94. Examples of optical media 94 include a digital video disk ("DVD"), DVD-R, DVD-RW, and any other media suitable for use in optical drive 100.

Optical drive 100 may include chipset 80 that may form part or all of the control circuitry for the operation of optical drive 100. As such, chipset 80 may contain a variety of electrical components such as controls for a laser lens system, disk drive mechanism controls, signal processing modules (not expressly shown) and optical tracking system 82.

Chipset 80 may also control and provide electrical power to light source 86 using light source connection 84 via optical tracking system 82. For example, light source 86 may be a laser diode such as a low power laser diode that emits a laser able to focus on optical media 94 via mirror 90 in order to read/write data from optical media 94 during an I/O operation. Generally, light source 86 emits the light along light path 88 towards mirror 90.

Mirror 90 typically forms a part of a lens system within optical drive 100 that enables the light to focus on optical media 94. Generally, the lens system includes objective lens 91 that focuses the reflected light onto CD media 94. Additionally, the lens system may include collimator lens 92 operable to gather light from light source 86 and convert the light into parallel light that can focus on CD media 94.

Generally, mirror 90 includes a polarized mirrored surface that is able to reflect a large percentage of the light toward optical media 94. The light reflected off of optical media 94 may be reflected back reflected path 88 such that the light passes through the polarized mirrored surface and is detected by photodiode 96.

Photo detector such as photodiode 96 typically forms a part of an optical pick-up mechanism in optical drive 100. Examples of photodiode 96 include any type of photodiode, photoelectric semiconductor device, or light detecting and/ or measuring device that is able to convert radiant energy, such as light, into electrical energy. For instance, the light that is detected by photodiode 96 may be converted into an electrical signal that is proportional to the amount of detected light. Generally, the amount of detected light may be measured using the amplitude or the electrical signal.

Photodiode 96 may be used to detect the light from light source 16 and may be used to detect light reflected off of optical media 94, which may be used to read data from optical media 94. Typically, the reflected light, which may be reflected from the pits 113 and lands 112 (described below in more detail) present on optical media 94, may be received as pulses of light. After photodiode 96 detects this light, photodiode 96 may generate a signal proportional to the light that may be sent to chipset 80 via signal path 95. At chipset 80, the signal may be decoded and redirected to information handling system 10 or any other type of output such as an audio or video output.

Figure 3:
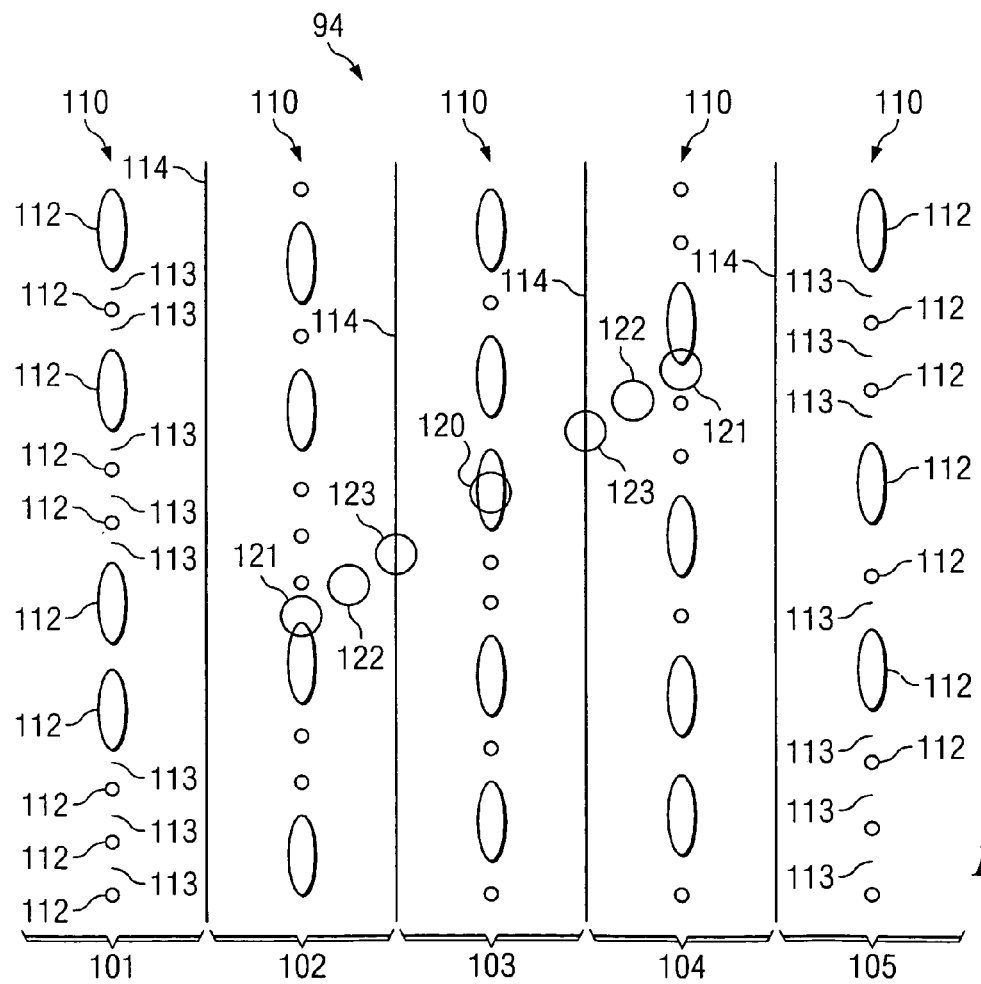
FIG. 3 illustrates an example embodiment of an optical tracking system using tracking beams with modified beam angles, according to teachings of the present disclosure.

FIG. 3 illustrates an example embodiment of an optical tracking system 100 using tracking beams 122 with modified beam angles on a section of CD media 94, which may be referred to as a modified 3-beam tracking system. Focusing light 88 from light source 86 onto CD media 94 typically includes a main beam or center beam 120 and one or more tracking beams 122. Center beam 120 is used to focus on pits 113 and lands 112 of a track on CD media 94.

In the example embodiment, the section of CD media 94 has five tracks, namely tracks 101, 102, 103, 104 and 105. Typically, tracks 101-105 spiral around CD media such that track 101 ends at the beginning of track 102. However, in alternate embodiments, tracks 101-105 are separate tracks that are not spiral around CD media 94.

As illustrated, center beam 120 is focused on track 103. Track 103 may be viewed as having a groove 110 that includes pits 113 and lands 112 bordered by lanes 114. Center beam 120 is set over groove 110 on track 103 such that the reflected light may be read by photodiode 96. Side beams or tracking beams 122 are set at modified beam angles that permit optical tracking system 80 to use either a differential push-pull (DPP) tracking method or a three-beam tracking method.

Generally, when using the DPP tracking method, DPP tracking beams 121 are set over grooves 110 of adjacent tracks such as track 102 and 104. Alternatively, when using the "conventional" three-beam tracking method, three-beam tracking beams 123 are set over lanes 114 of the adjacent tracks, namely tracks 102 and 104. Because each method has set their respective tracking beams at different locations, optical drive 100 generally selects one of the tracking methods and sets the beams accordingly.

Setting tracking beams 122 at modified angles between lanes 114 and groove 110 of the adjacent tracks, optical tracking system 100 may use either tracking method. As illustrated, tracking beams 122 are set outside of track 103, where center beam 120 is reading pits 113 and lands 112, and into adjacent tracks (e.g., tracks 102 and 104). In one embodiment, tracking beams 122 are placed approximately halfway between lane 114 and groove 110 of the respective track, which allow either method to track CD media 94.

Figure 4:
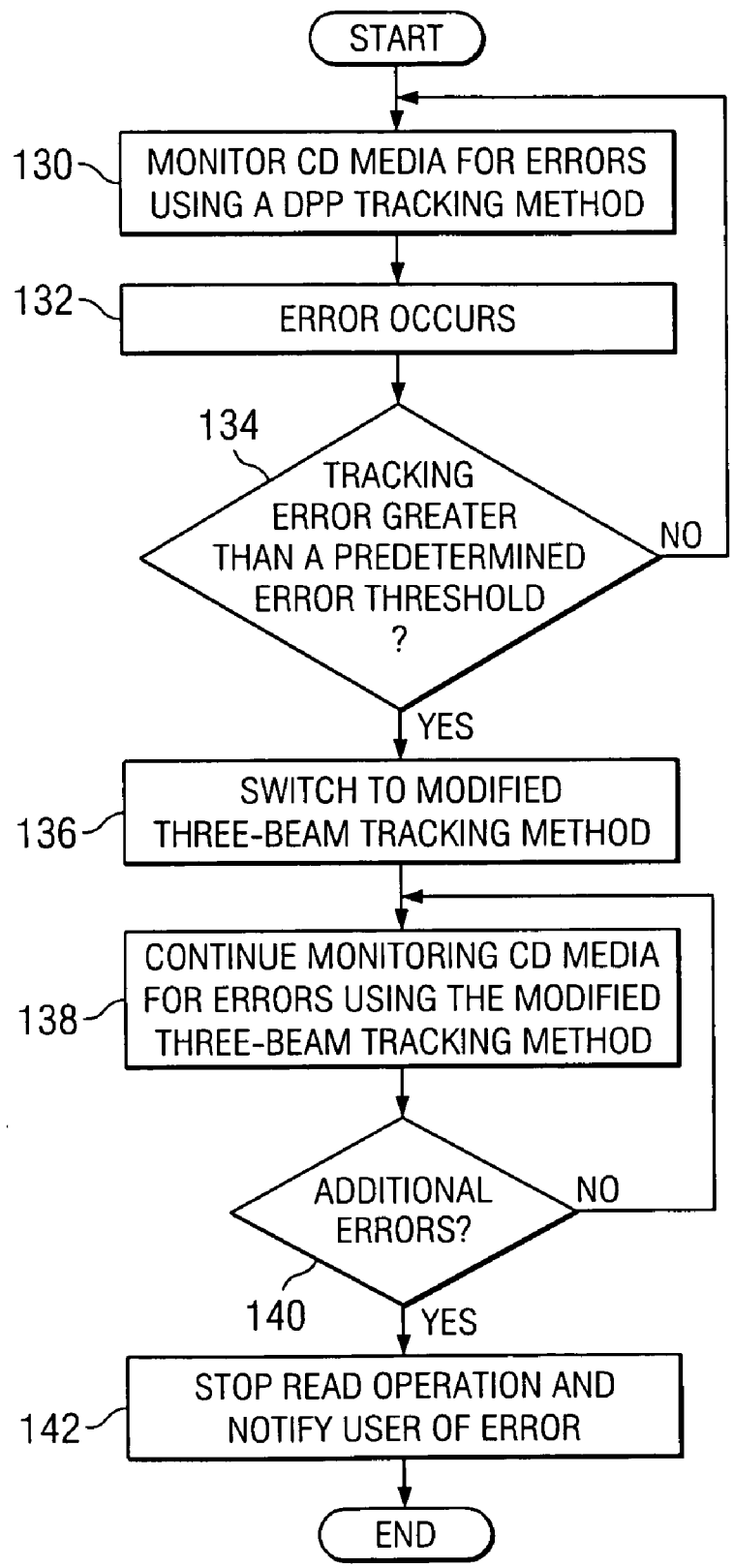
FIG. 4 is a flowchart for a method of improving readability in an optical drive, according to teachings of the present disclosure.

FIG. 4 is a flowchart for a method of improving readability in optical drive 100. At block 130, tracking system 80 monitors CD media 94 for tracking errors using a DPP tracking method. In some embodiments, the DPP tracking method is set as the default tracking method. Upon the occurrence of a tracking error at block 132, tracking system 80 measures the level of error.

Typically, the level of error is measured as compared to a predefined error threshold. The predefined error threshold may be selected based on a minimal level of electrical signal required to read the tracking signal. In one instance, the tracking error is based an amplitude of the electrical signal measured at the occurrence of the tracking error.

At block 134, the amplitude or other measured level of tracking error is compared to the predefined error threshold. If the measured tracking error is greater than the predetermined error threshold, optical drive 100 may return to block 130 and continue reading CD media 94 such as re-reading the particular location where the error occurred. However, if the measured tracking error falls below the predefined error threshold, optical tracking system 80 may switch to a modified three-beam tracking method at block 136.

For example, if the measured tracking error is based on measured amplitude of the electrical signal, the amplitude must be less than the predetermined error threshold to switch to the modified three-beam method. To that end, tracking system 80 may continue use the DPP tracking method if the amplitude is sufficiently high compared to the predetermined error threshold. However, tracking system 80 may switch to the modified three-beam tracking system if the amplitude is relatively low.

Based on using the modified three-beam tracking method, tracking system 80 monitors CD media 94 for tracking errors at block 138. If the tracking system 80 determines that additional tracking errors have occurred using the modified three-beam tracking method at block 140, tracking system 80 may cause the I/O operation to fail (e.g., the read operation stops), at block 142. Typically, when an I/O operation is stopped, a notification is sent to a user to inform that the error has occurred and that the I/O operation has failed. In some instances, the failure of the I/O operation is based on a first and second tracking error occurring at approximately the same particular location on CD media 94.

Although the disclosed embodiments have been described in detail, it should be understood that various changes, substitutions and alterations can be made to the embodiments without departing from their spirit and scope.

What is claimed is:

1. A method of improving readability in an optical drive, comprising:

monitoring a compact disc (CD) media for tracking errors using a differential push-pull (DPP) method during an input/output (I/O) operation in an optical drive;

upon the occurrence of a first tracking error, determining whether the first tracking error is greater than a predetermined error threshold; and based on the determination, switching from the DPP method to a three-beam tracking method.

2. The method of claim 1, further comprising causing the I/O operation to fail based on a second tracking error using the 3-beam method.

3. The method of claim 2, wherein the first and second tracking errors occurred at approximately the same particular location on the CD media.

4. The method of claim 2, further comprising notifying a user that the I/O operation has failed.

5. The method of claim 1, wherein monitoring further comprising electronically measuring an amplitude of a tracking error signal during the I/O operation to determine the first and second tracking error.

6. The method of claim 5, wherein switching to the three-beam method is based on the amplitude being relatively low.

7. The method of claim 5, further comprising continuing to use the DPP tracking method based on the amplitude being sufficiently high.

8. An information handling system, comprising:

a processor;

a memory operably coupled to the processor;

an optical drive communicatively coupled to the processor, the optical drive operable to perform input/output operations;

an optical tracking system forming a part of the I/O operations, the optical tracking system operable to follow a first track on a compact disc (CD) placed in the optical drive, the first track including pits aligned along a centerline of the first track;

the optical tracking system including a center beam operable to read information on the first track, the center beam aligned over the centerline of the first track; and the optical tracking system further including a tracking beam positioned between the first track and a second track adjacent the first track such that a centerpoint of the tracking beam is located between (a) a centerline of the second track and (b) a lane located midway between the centerline of the first track and the centerline of the second track.

9. The information handling system of claim 8, wherein the tracking beam is set approximately halfway between the centerline of the second track and the lane located between the centerlines of the first and second tracks.

10. The information handling system of claim 8, further comprising the optical tracking system operable to selectively switch between a differential push-push (DPP) tracking method and a three-beam method.

11. The information handling system of claim 10, wherein the optical tracking system selectively switches based on an occurrence of a tracking error.

12. The information handling system of claim 8, further comprising two tracking beams.

13. The information handling system of claim 12, further comprising the two tracking beams are positioned such that each tracking beam monitors a different track.

14. The information handling system of claim 8, wherein the tracking beam is set based a modification to beam angles.

15. A system for improving readability in an optical drive, comprising:
- an optical drive operable to perform input/output operations, the optical drive including an optical tracking system;
- the optical tracking system operable to follow a first track on a compact disc (CD) placed in the optical drive;
- the optical tracking system including a center beam operable to read information on the first track; and
- the optical tracking system further includes tracking beams having modified beam angles, each tracking beam positioned between the first track and an adjacent track such that a centerpoint of the tracking beam is located between (a) a centerline of the adjacent track and (b) a lane located midway between the centerline of the first track and the centerline of the adjacent track, wherein the tracking beams are operably set to switch between a differential push-pull (DPP) tracking method and a three-beam tracking method.

16. The system of claim 15, further comprising at least one photo detector operable to read the center beam and the tracking beams.

17. The system of claim 16, further comprising an amplitude measured by the at least one photo detector, the amplitude operable to determine a level of tracking error.

18. The system of claim 17, wherein the level of tracking error further comprises a predetermined error threshold for comparison to the measured amplitude, the predetermined error operably selected to determine when to switch between the DPP tracking method and the three-beam tracking method.

19. The system of claim 15, further comprising a notification to a user based on a failure of the DPP tracking method and the three-beam tracking method to follow the track on the CD.

20. The system of claim 15, wherein each tracking beam is set approximately halfway between (a) the centerline of the first track and (b) the lane located between the centerline of the first track and the centerline of the adjacent track corresponding to that tracking beam.

* * * * *